United States Patent [19]

Kusakabe

[11] Patent Number: 5,167,025
[45] Date of Patent: Nov. 24, 1992

[54] PROGRAMMABLE CONTROLLER GENERATING PLURAL ALTERNATING CLOCKS WITH EACH CLOCK CONTROLLING DIFFERENT PARTS OF INSTRUCTION SEQUENCING MECHANISM

[75] Inventor: Hiroyuki Kusakabe, Tokyo, Japan

[73] Assignee: Kabushiki Kaisha Toshiba, Kanagawa, Japan

[21] Appl. No.: 313,562

[22] Filed: Feb. 22, 1989

[30] Foreign Application Priority Data

Feb. 23, 1988 [JP] Japan ................. 63-40109

[51] Int. Cl.⁵ ............................... G06F 9/00
[52] U.S. Cl. ................... 395/375; 364/247.4; 364/247.6; 364/262.4; 364/271; 364/DIG. 2; 395/550
[58] Field of Search ........... 364/200, 200 MS File, 364/900 MS File; 395/375, 550

[56] References Cited

U.S. PATENT DOCUMENTS

| | | | |
|---|---|---|---|
| 4,255,785 | 3/1981 | Chamberlin | 364/200 |
| 4,257,096 | 3/1981 | McCullogh | 364/200 |
| 4,407,016 | 9/1983 | Bayliss | 364/200 |
| 4,418,383 | 11/1983 | Doyle | 364/200 |
| 4,447,873 | 5/1984 | Price | 364/200 |
| 4,454,578 | 6/1984 | Matsumoto | 364/200 |
| 4,532,587 | 7/1985 | Roskell | 364/200 |
| 4,574,348 | 3/1986 | Scallon | 364/200 |
| 4,587,612 | 5/1986 | Fisk | 364/200 |
| 4,704,678 | 11/1987 | May | 364/200 |
| 4,714,994 | 12/1987 | Oklobzija | 364/200 |
| 4,734,849 | 3/1988 | Kinoshita | 364/200 |
| 4,755,933 | 7/1988 | Teshima | 364/200 |
| 4,755,935 | 7/1988 | Davis | 364/200 |
| 4,791,557 | 12/1988 | Angel | 364/200 |
| 4,809,159 | 2/1989 | Sowa | 364/200 |
| 4,829,425 | 5/1989 | Bain | 364/200 |
| 4,918,587 | 4/1990 | Pechter | 364/200 |

Primary Examiner—Thomas C. Lee
Assistant Examiner—Eric Coleman
Attorney, Agent, or Firm—Finnegan, Henderson, Farabow, Garrett and Dunner

[57] ABSTRACT

A programmable controller is disclosed for controlling a system including a program memory unit for storing a group of sequence instructions including an instruction part and operand part, a data memory unit for storing a plurality of system data, a sequence execution control unit for executing sequence computations based on instructions fetched from the program memory unit and the system data from the data memory unit, and a holding register unit for holding the operand part as address part of the system data when the sequence execution control unit fetches the instruction from the program memory.

2 Claims, 4 Drawing Sheets

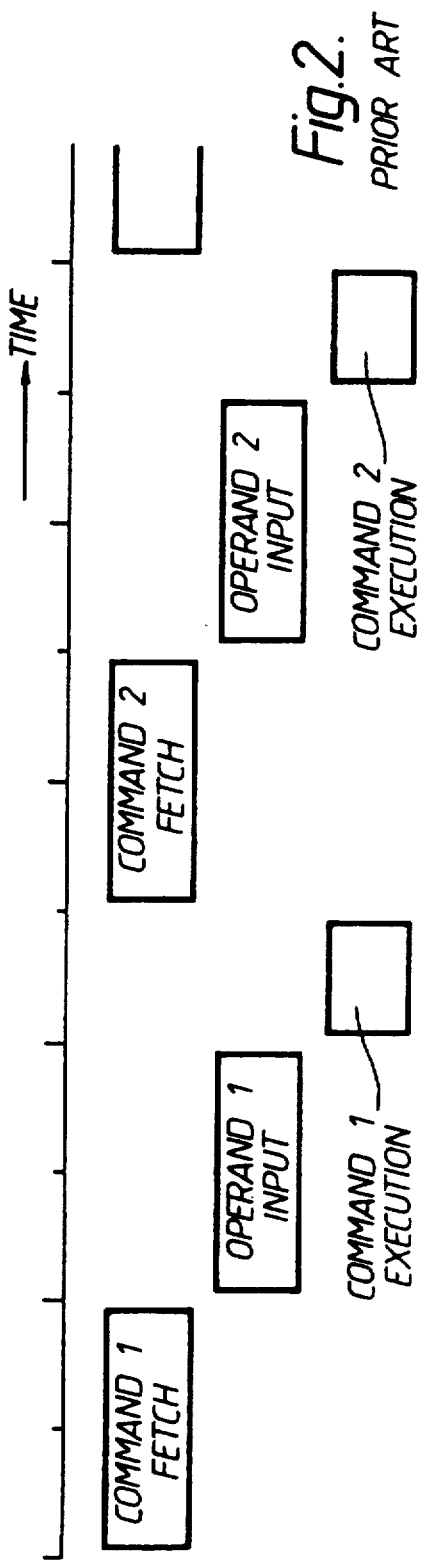
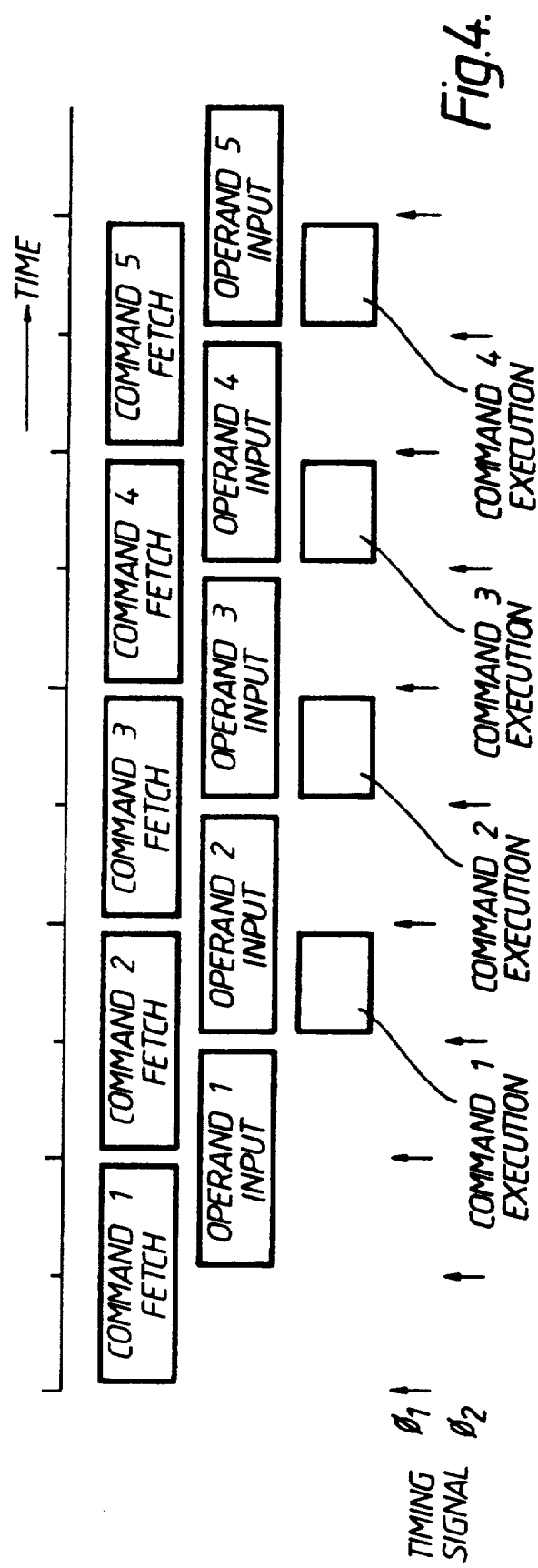

PROGRAMMABLE CONTROLLER GENERATING PLURAL ALTERNATING CLOCKS WITH EACH CLOCK CONTROLLING DIFFERENT PARTS OF INSTRUCTION SEQUENCING MECHANISM

BACKGROUND OF THE INVENTION

This invention relates to a programmable controller, and more particularly to a programmable controller and related method of controlling execution of a sequence program.

FIG. 1 is a diagram showing a conventional programmable controller. A sequence execution control part 11 is connected by a common address bus 12 and a data bus 13 to a program memory 14 and a data memory 15. Program memory 14 stores a group of sequence instructions consisting of an instruction part 14a and an operand part 14b. Data memory 15 stores computation data such as process input/output data and internal data. Sequence execution control part 11 executes sequence computations based on computation data from data memory 15 and an instruction fetched from program memory 14.

That is, sequence execution control part 11 inputs sequence instructions into an instruction register 16 through a data bus 13, from the program address in program memory 14 designated through common address bus 12 by an instruction pointer 17. Next, through common address bus 12, instruction register 16 designates, in data memory 15, operand part 14b, i.e. the address in data memory 15, of this sequence instruction and inputs it, through data bus 13, into data register 18. Finally, based on the content of instruction register 16 and the content of data register 18, a binary logic computation, which constitutes the main part of the sequence instructions, is executed by a bit computation processing part 19.

FIG. 2 shows a conceptual view of the operation of the programmable controller in this case. As shown in FIG. 1, the execution time for one instruction of the binary logic instructions constituting the sequence instructions is the sum of the instruction fetch time, the operand data input time, and the instruction execution time. Furthermore, the time required for memory access for instruction fetch or operand data input is longer than the time required for the binary logic computation that represents the instruction execution time.

The above points up to the problem that, in the conventional programmable controller, memory access time represents a large proportion of the sequence instruction execution time, which otherwise mainly consists of binary logic computation. This memory access time therefore results in loss time, preventing the execution of sequence instructions from being carried out at high speed.

SUMMARY OF THE INVENTION

It is an object of this invention to speed up execution of sequence instructions.

Another object of the invention is to make it possible to improve the processing capability of a programmable controller.

The foregoing objects are achieved according to the present invention by providing a system data controller comprising program memory means for storing a group of sequence instructions including an instruction part and operand part, data memory means for storing a plurality of system data, sequence execution control means for executing sequence computations based on a instruction fetched from the program memory means and the system data from the data memory means, and holding register means for holding the operand part as an address part of the system data when the sequence execution control means fetches the instruction from the program memory.

According to another aspect of the present invention, the above objects are achieved by providing a method of controlling a system comprising the steps of storing a plurality of sequence instructions having an instruction part and an operand part, storing a plurality of system data, executing sequence computations based on instructions fetched from the stored sequence instructions and the stored system data, and holding the operand part as an address part of the system data when the instruction from the stored sequence instructions is fetched.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which:

FIG. 2 is a diagram showing the operation of the conventional programmable controller of FIG. 1.

FIG. 4 is a time chart showing the operation of the programmable controller of FIG. 3.

DESCRIPTION OF THE PREFERRED EMBODIMENT

Figure 1:
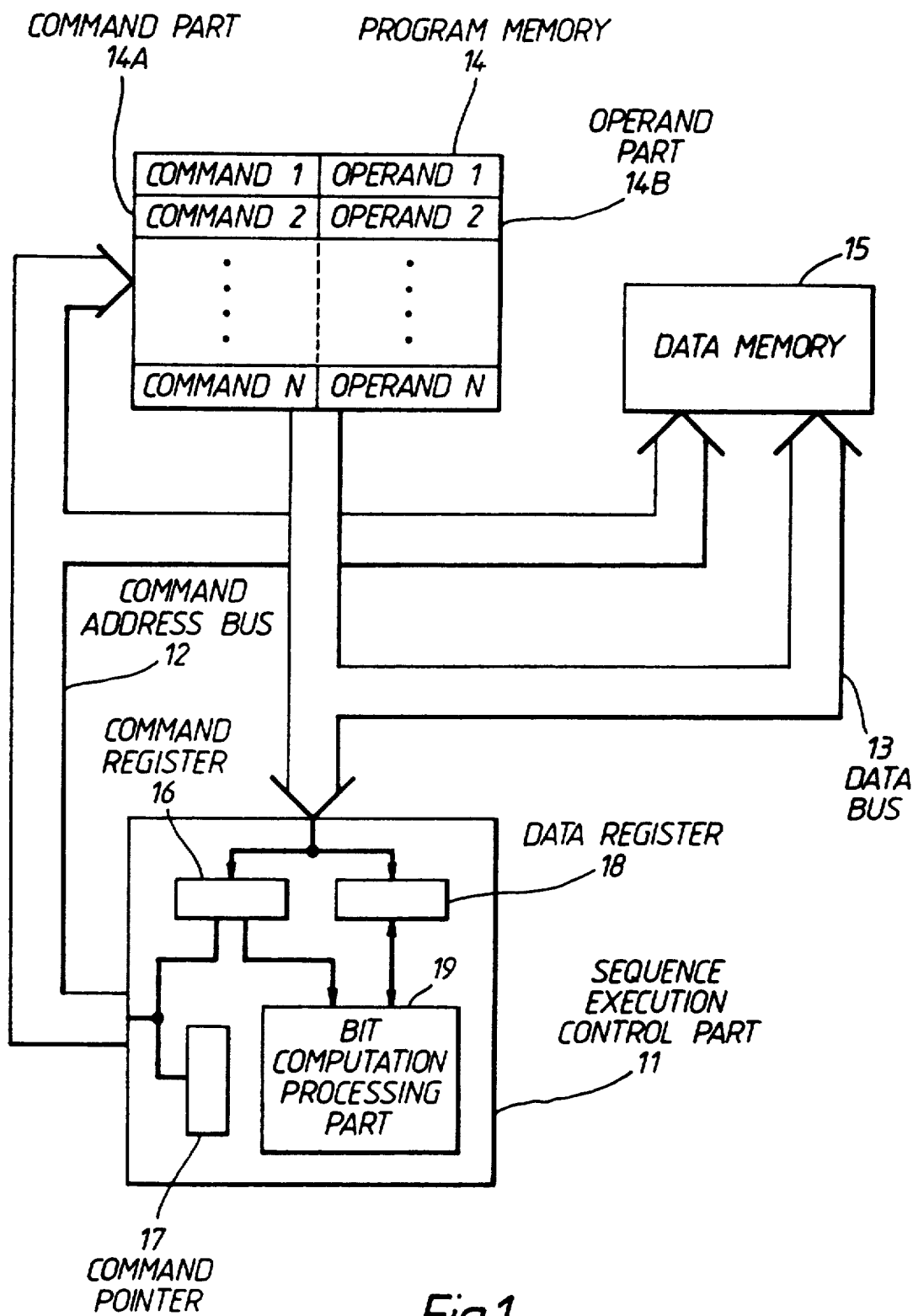
FIG. 1 is a block diagram showing a conventional programmable controller.

The invention is described below with reference to the embodiment shown in the drawings.

Figure 3:
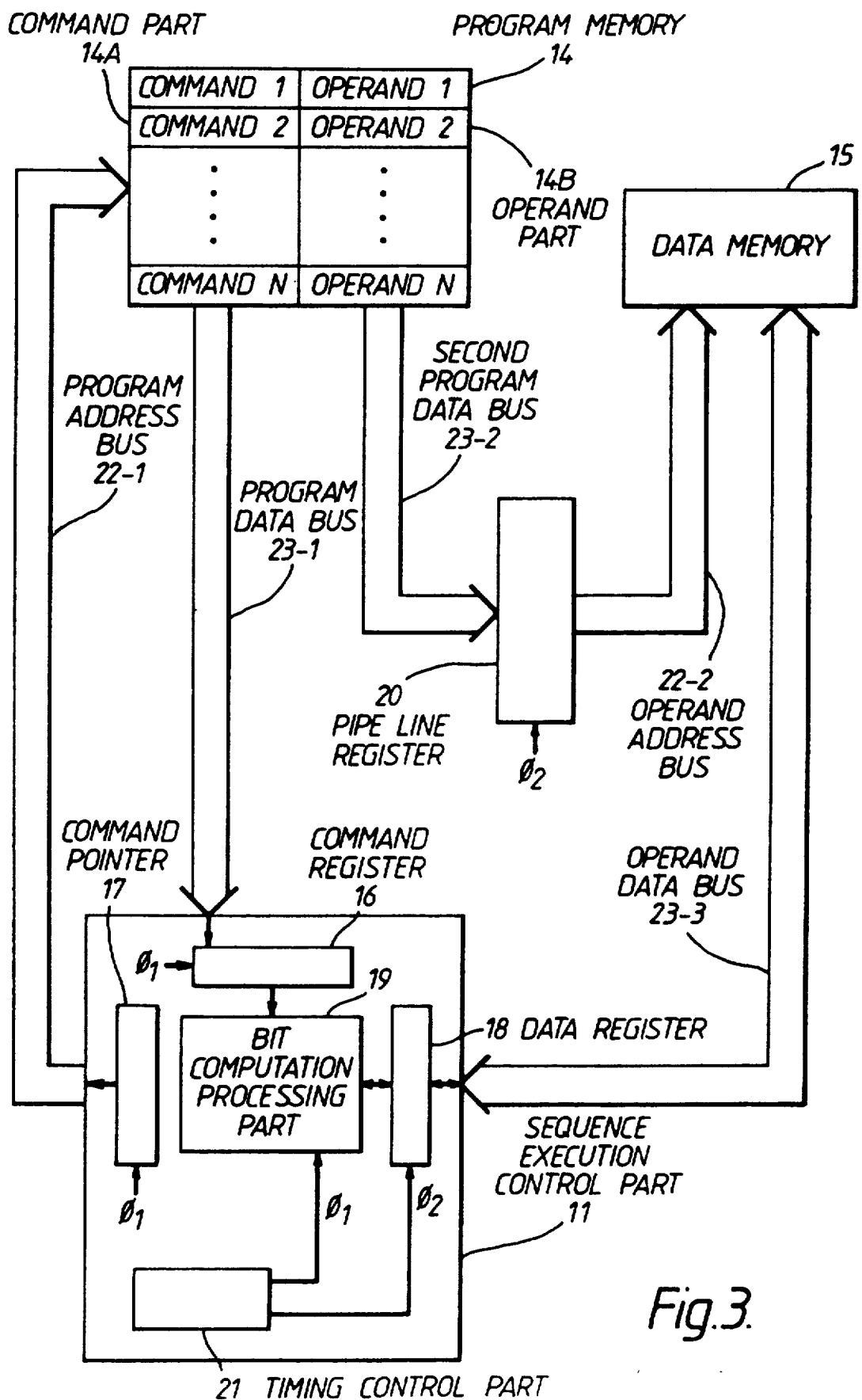
FIG. 3 is a time chart showing a programmable controller according to this invention.

FIG. 3 is a block diagram showing an embodiment of a programmable controller according to this invention. As shown in FIG. 3, the programmable controller of this embodiment includes a program memory 14, a system data memory 15, a sequence execution control part 11, and a pipeline register 20 which constitutes a holding register. Sequence execution control part 11 includes an instruction pointer 17, an instruction register 16, a data register 18, a bit computation processing part 19, and a timing control part 21. Instruction pointer 17 and program memory 14 are connected by a program address bus 22-1, and instruction register 16 and program memory 14 are connected by first program data bus 23-1. Program memory 14 and pipeline register 20 are connected by second program data bus 23-2, and data memory 15 and pipeline register 20 are connected by an operand address bus 22-2. Furthermore, data memory 15 and data register 18 are connected by an operand data bus 23-3.

Program memory 14 stores a group of sequence instructions consisting of instruction part (instruction parts 1 to N) and operand part (operand parts 1 to N). Data memory 15 stores computation data such as process input/output data, and internal data. Pipeline register 20 latches the operand part 14b that constitutes the address of the computation data. Sequence execution control part 11 executes sequence computation based on computation data input from data memory 15 and an instruction part fetched from program memory 14.

Specifically, in sequence execution control part 11, instruction pointer 17 designates a program address in program memory 14, and instruction register 16 latches the instruction part of program memory 14. Furthermore, data register 18 latches the computation data from data memory 15, and bit computation processing part 19 executes binary logic computation, which is the main part of the sequence instruction, based on the content of instruction register 16 and the content of data register 18. Furthermore, timing control part 21 generates timing signals $\phi_1$, $\phi_2$ from the internal clock signal, $\phi_1$, controls the operation of instruction pointer 17, instruction register 16, and bit computation processing part 19. Timing signal $\phi_2$ controls the operation of data register 18 and pipeline register 20.

The operation of the programmable controller constructed as above will now be described.

First of all, on timing signal $\phi_1$ that updates the content of instruction pointer 17, the instruction part and operand part of program memory 14 whose address is the content of instruction pointer 17 before update, are respectively input into instruction register 16 and pipeline register 20. Next, on timing signal $\phi_2$, the computation data of data memory 15 whose address is the content of pipeline register 20 is input into data register 18. At the same time as this, in order for the computation data of the next instruction to be input, pipeline register 20 is put in a transparent state, having regard to the memory access time of data memory 15. Subsequently, binary logic computation is executed at timing signal $\phi_1$ by bit computation processing part 19, based on the content of instruction register 16 that has already been input, and based on the content of data register 18. Also at the same time as this, the content of a instruction pointer 17 is updated on timing signal $\phi_1$. FIG. 4 shows conceptually the operation of a the programmable controller in this case. On timing signal $\phi_1$, execution of previous instructions and fetching of current instruction are completed, at the same time, fetching of next instruction is started. On timing signal $\phi_2$, input of operand data (computation data) of current instruction is completed and input of operand data (computation data) of next instruction is started.

Figure 5:
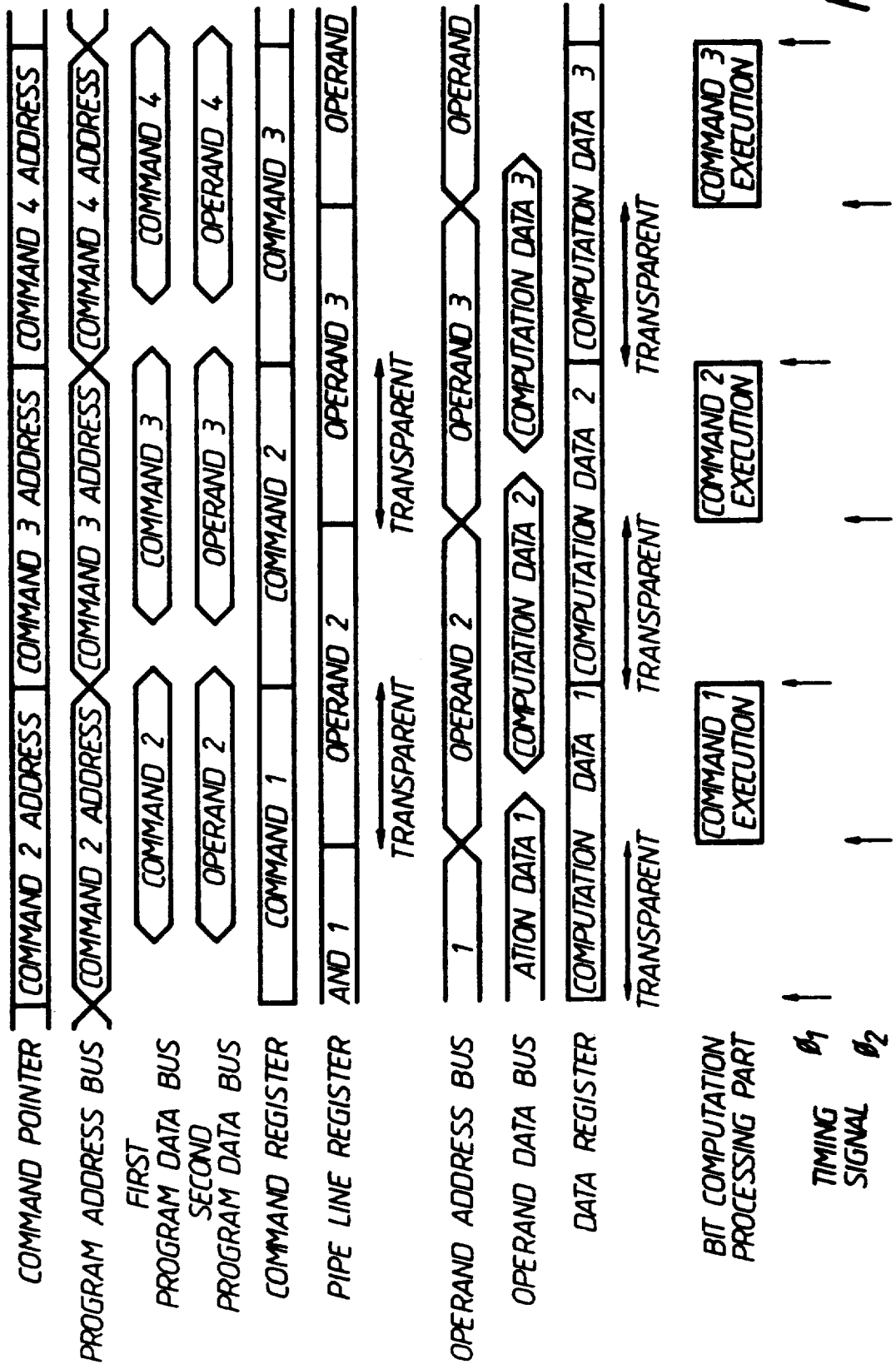
FIG. 5 is a time chart showing in more detail the operation of the programmable controller of FIG. 3.

The details of the above operation will be explained with reference to FIG. 5.

First of all, the content of instruction pointer 17 is updated with timing signal $\phi_1$, and the address of instruction 3 is output. At the same time as this, instruction 2 and operand 2 that have already been output by program memory 14 are respectively latched in instruction register 16 and pipeline register 20. Thereupon, with timing signal $\phi_2$, operand 2 starts to be input in the transparent state, and operand 2 constituting the address of computation data is already output to operand address bus 22-2.

Next, in data register 18, input of computation data 2 is commenced in the transparent state from timing signal $\phi_1$, and it is latched with timing signal $\phi_2$.

Subsequently, the binary logic computation that is the major part of the sequence instruction is executed on timing signal $\phi_1$ by bit computation processing part 19, based on the computation data 2 that is input into data register 18. After this, the above operation is repeated.

As described above, in a programmable controller according to this embodiment, the program address bus 22-1 and operand address bus 22-2 are separate, and the first program data bus 23-1 and second program data bus 23-2 and operand data bus 23-3 are separate. Also, second program data bus 23-2 and operand address bus 22-2 are separately provided with pipeline register 20, so fetching of the next instruction and execution of the current instruction can be carried out by simultaneous processing. That is, the next instruction fetching is performed using instruction pointer 17, program address bus 22-1, first program data bus 23-1, and second program data bus 23-2. Instruction execution is performed using pipeline register 20, operand address bus 22-2, operand data bus 23-3, instruction register 16, data register 18 and bit computation processing part 19. Fetching of the next instruction and execution of the current instruction can therefore be carried out simultaneously.

Consequently, in the period of sequence instruction execution, of which the major part consists of binary logic computation, the proportion occupied by memory access time can be reduced, so high speed computation execution of sequence instructions can be achieved with reduced loss time. By this means, an upgrading of the processing capability of the programmable controller can be achieved, and the control accuracy which is the objective of a programmable controller can be improved.

Numerous modifications and variations of the present invention are possible in light of the above teachings. It is therefore to be understood that, within the scope of the appended claims, the present invention can be practiced in a manner other than as specifically described herein.

What is claimed is:

1. A programmable system controller, comprising:
   program memory means for storing a group of sequence instructions, each of the sequence instructions including an instruction part and an operand part;
   data memory means for storing a plurality of system data including computation data and an address part;
   sequence execution control means for fetching a sequence instruction from the program memory means, for executing sequence computation based on an instruction part of the fetched sequence instruction, and for fetching system data corresponding to the fetched instruction part of the fetched sequence instruction in one time cycle, the sequence execution control means including:
   instruction pointer means for designating in the program memory a given program address,
   instruction register means for latching an instruction part stored in the program memory means,
   data register means for latching the computation data of the data memory means,
   bit computation processing means for executing sequence computations based on the latched instruction part in the instruction register means and the latched computation data in the data register means, and timing control means for controlling the times of the operation of the instruction pointer means, the instruction register means, the data register means, and the bit computation processing means; and holding register means for holding an operand part, corresponding to the fetched instruction part of the fetched sequence instruction, as the address part of the system data while the sequence execution control means fetches a next instruction part from the program memory means;

wherein the timing control means generates alternate first and second clock signals, wherein each first clock signal controls the time of operation of the instruction pointer means, the instruction register means, and the bit computation processing means, and each second clock signal controls the time of operation of the data register means and the holding register means.

2. A method of controlling a system comprising the steps of:

storing a group of sequence instructions, each of the sequence instructions including an instruction part and an operand part;

storing a plurality of system data;

executing a plurality of sequence computations based on instruction parts fetched from the stored sequence instructions and the system data respectively corresponding to the fetched instruction parts, each execution being performed in one time cycle, wherein the step of executing includes the substeps of designating a program address, latching an instruction corresponding to the designated program address, latching the stored system data, and controlling the timing of the substeps of designating, latching the instruction, and latching the stored data;

wherein the substep of controlling the timing includes generating alternate first and second clock signals, using the first clock signal to control the substeps of designating and latching the instruction, and using the second clock signal to control the substep of latching the stored system data; and holding an operand part corresponding to the fetched instruction part as an address part of system data at times when a succeeding instruction part from the stored sequence instructions is fetched.

* * * * *